United States Patent [19]

Barrett

[11] Patent Number: 5,442,746
[45] Date of Patent: Aug. 15, 1995

[54] PROCEDURAL USER INTERFACE

[75] Inventor: Williard H. Barrett, Garden Grove, Calif.

[73] Assignee: Hughes Aircraft Company, Los Angeles, Calif.

[21] Appl. No.: 937,801

[22] Filed: Aug. 28, 1992

[51] Int. Cl.[6] .............................................. G06F 19/00
[52] U.S. Cl. .................................. 395/161; 395/159
[58] Field of Search ............... 395/159, 160, 161, 155; 364/146, 148, 152, 188, 474.01

[56] References Cited

U.S. PATENT DOCUMENTS

| | | | |
|---|---|---|---|
| 4,901,221 | 2/1990 | Kodosky et al. | 395/161 |
| 4,920,514 | 4/1990 | Aoki | 395/159 |
| 5,119,475 | 6/1992 | Smith et al. | 395/160 |
| 5,122,717 | 6/1992 | Hayashi | 318/569 |
| 5,168,441 | 12/1992 | Onarheim et al. | 364/146 |
| 5,179,657 | 1/1993 | Dykstal et al. | 395/161 |
| 5,187,797 | 2/1993 | Nielsen et al. | 395/160 |
| 5,237,654 | 8/1993 | Shackelford et al. | 395/160 |
| 5,247,693 | 9/1993 | Bristol | 395/800 |
| 5,297,253 | 3/1994 | Meisel | 395/161 |
| 5,301,301 | 4/1994 | Kodosky et al. | 364/191 |

FOREIGN PATENT DOCUMENTS 0451963  10/1991  European Pat. Off. .
WO9106050  5/1991  WIPO .

OTHER PUBLICATIONS

"PSS: A System for Process Enactment," R. F. Bruynooghe et al. Proceedings of the First International Conference on the Software Process, IEEE Computer Society Press, Oct. 21-22, 1991, pp. 128-141.

"The Practical Application of Process Modelling—some early reflections," B. Warboys, First European Workshop on Software Process Modeling, Milan, May 30-31, 1991.

"Dynamics of Process Models in PML," C. Roberts, A. Jones, 1990 IEEE, Mar. 1989.

"Describing and Acting Process Models with PML," C. Roberts, Apr. 1988, pp. 137-141.

IBM Technical Dislosure Bulletin, vol. 34, No. 8, Jan. 1992, pp. 386-388, "Dynamic Icon Navigation to Nested Containers".

Primary Examiner—Heather R. Herndon
Assistant Examiner—N. Kenneth Burraston
Attorney, Agent, or Firm—W. K. Denson-Low

[57] ABSTRACT

A simplified procedural user interface ("PUI") for controlling the operation of a computer, defined in terms of the steps or procedures required to do a given operation. The PUI acts as a graphical checklist that indicates to the user what has to be done and then controls the operation of the computer required to implement the operation. The PUI provides a linked icon representation of a user's task in a series of hierarchical panels. The linked icons indicate the steps a user must go through to complete a task using the computer. The hierarchical panels on which the icons reside provide a means to logically group related task steps. The underlying concept is to simplify the computer operation by only presenting the capability required to do a particular task at a given time.

11 Claims, 8 Drawing Sheets

PROCEDURAL USER INTERFACE

This invention was made with Government support. The government has certain rights in this invention.

BACKGROUND OF THE INVENTION

This invention relates to providing a simplified mechanism for controlling the operating of a computer system.

In the recent past, computer users have been required to be both expert in their discipline as well as in the operation and control of the computer used to execute the discipline. That is, the user has been required to know both what has to be done and how to use the computer tools to do what has to be done. The problems have been compounded as computer systems have increased in sophistication and power.

These problems associated with the desktop computing sophistication have been recognized since the early 1980's. The technical focus of solutions directed to this problem have been to make the computer easier to use. This has been by making the operation consistent across various applications. Apple Computer's "Macintosh" graphical user interface, "Windows" software marketed by Microsoft Corporation for the IBM-PC, "Motif" software for UNIX computers, and "Open Look" software for Sun Microsystems computers have all attempted to address this complexity issue through the common "look and feel" approach. These solutions somewhat address the level of expertise required of users in the operation of the computer, in that once an application is learned, similar applications on the same computer operate similarly. However, the user still is required to be expert in knowing what the job is.

One solution to the problem of user expertise in the discipline has been to define the job as a series of tasks on checklists. For example, a job for a secretary may be to scan a color document into a personal computer, compress the file to shorten transmission time, then transmit the compressed file to a remote office via a modem. This job may entail three checklists as shown in Tables I–III:

TABLE I

| CHECKLIST 1 |
| --- |
| Scan a Document |
| ☐ Start Scanner Application |
| ☐ Set up application to scan a color document |
| ☐ Scan document |
| ☐ Save image in a file |
| ☐ Quit Scanner Application |

TABLE II

| CHECKLIST 2 |
| --- |
| Compress the File |
| ☐ Start file compression appln |
| ☐ Compress image file in JPEG format |
| ☐ Save compressed file |
| ☐ Quit File Compression application |

TABLE III

| CHECKLIST 3 |
| --- |
| Send file via Modem |
| ☐ Start communications application |
| ☐ Set up modem communications to Omaha office |
| ☐ Send compressed file |
| ☐ Quit Communications application |

As can be recognized in the tasks defined in each of the three checklists, the tasks indicate what is to be done but not how to use the computer to implement or execute the tasks. The secretary still must be relatively expert in using the computer to do the job defined on the checklists.

SUMMARY OF THE INVENTION

The procedural user interface ("PUI") in accordance with this invention solves this problem by capturing the task steps, or procedure, the user goes through in a simplified representation. The PUI is a simplified system control mechanism in which a users' job is captured as a series of linked icons in hierarchical windows or display panels. The linked icons represent the tasks a user must go through to complete a job using the computer. These linked icons activate and control predefined operations to launch and control computer functional applications. The PUI can be described as a graphical standard operating procedure or graphical check list that indicates to the user what has to be done and then helps the user do it. One advantage is that there are only two types of icon controls a user must learn, panel navigation icons and task icons, which greatly reduces training time for new users. This means that the user is no longer required to be expert in the discipline because the steps in the job are represented on the screen. A second advantage is that a structure is applied to a collection of tools, but the user is not restricted in the use of those tools. A new user can be immediately productive, but an advanced user is not constrained by that structure. A PUI is applicable for any job that can be structured as a series of well-defined and repeatable tasks a user must go through to solve a problem using a computer system.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

The invention can be described as a procedural user interface (PUI), which is a graphical checklist that indicates to the user what has to be done and then controls the operation of the computer required to implement the operation. This invention provides a linked icon representation of a user's job in a series of hierarchical panels. The linked icons indicate the tasks a user must perform to complete a job using the computer. The hierarchical panels on which the icons reside provide a means to logically group related tasks. The underlying concept is to simplify the computer operation by only presenting the capability required to do a particular task at a given time.

The procedural user interface ("PUI") in accordance with this invention can be illustrated by an application directed to the secretarial task illustrated in the checklists of Tables I–III above. The PUI solves this problem in three ways. First, the checklist is represented on the computer display as a series of linked icons, which provides the advantage of presenting a concise, simple graphical representation of what the job is. Second, the underlying operating system control commands to launch applications, retrieve data files, and so on are automatically executed when the icon is activated, thereby reducing the level of expertise required to operate the system, to knowledge of how to activate the icon. Third, the flow of data required from task to task is inherently managed by the system by only allowing access to capabilities and applications required to do the task represented on the PUI panel.

Figure 1:
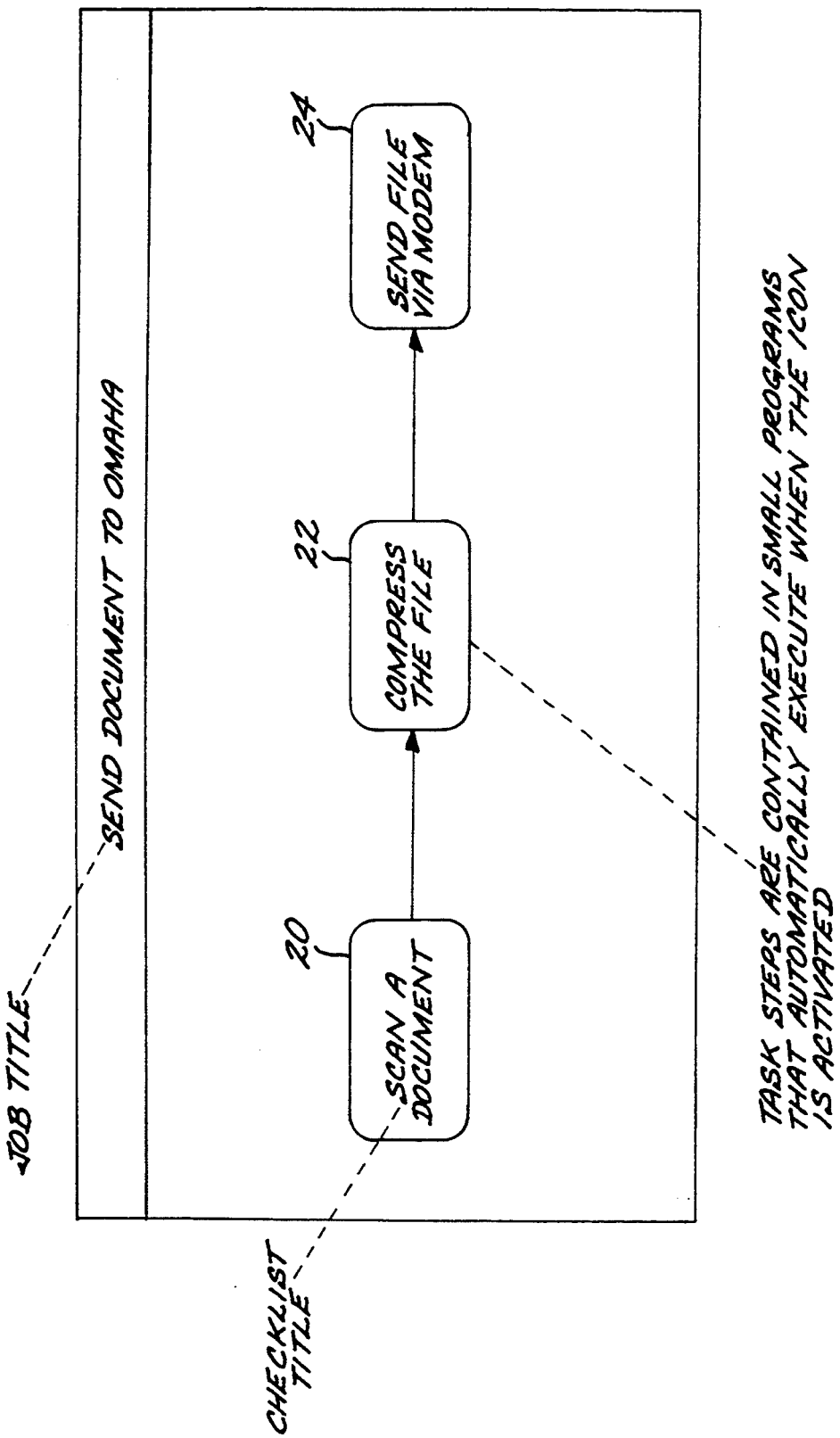
FIG. 1 is an exemplary representation of a procedural user interface (PUI) for performing an exemplary job.

FIG. 1 illustrates an example PUI representation for the exemplary secretarial job. The PUI representation of FIG. 1 is a simple representation, including three task icons 20, 22 and 24. Icon 20 represents the task of scanning a document, icon 22 the task of compressing the resulting file, and icon 24 the step of sending the compressed file via a modem to a computer at a remote location, designated here as Omaha. Upon user activation of icon 20, e.g., by pointing and clicking a computer mouse at this icon, or by positioning a cursor at this icon on the display and depressing a given keyboard key, the operation of scanning the document is automatically executed. The various tasks set forth in the checklist of Table I are automatically executed by the computer without further user involvement. Next, upon user activation of icon 22, the operation of compressing the file resulting from the scanning operation is automatically executed by the computer. Thus, each of the tasks of Table II is automatically executed. Finally, upon user activation of icon 24, the compressed file will be transmitted via modem to Omaha, by automatic computer execution of each of the tasks of Table III, again without further user involvement.

Figure 2:
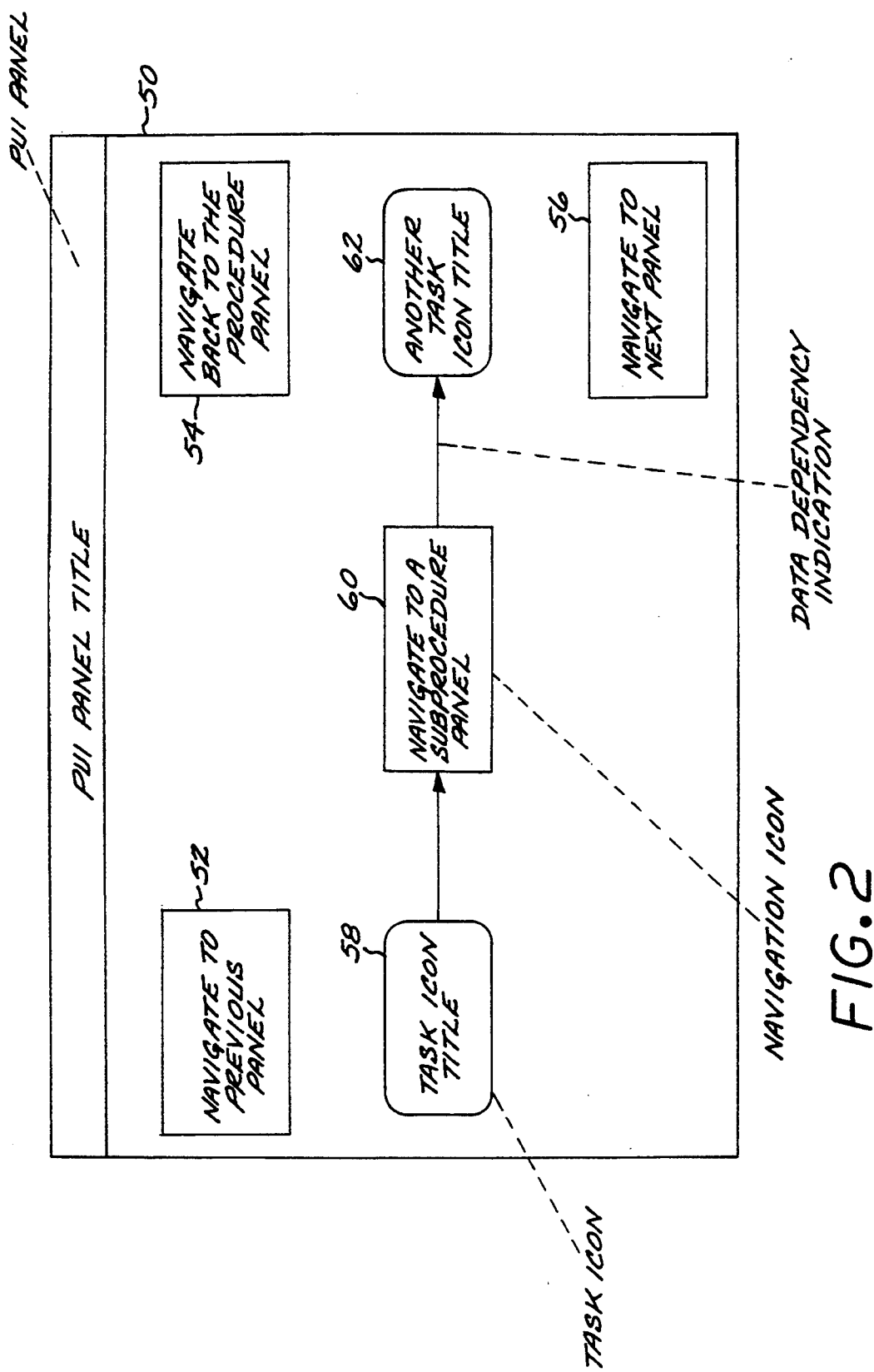
FIG. 2 illustrates the graphical syntax of a PUI representation.

The PUI manages the representation of the tasks to be done, activates and controls the computer, and manages data flow through the system. FIG. 2 illustrates the graphical syntax of a PUI representation. There is no inherent limit to the number of icons that can be placed on a PUI panel 50. In addition, not all panels will require a complete compliment of navigation icons, and in simple cases where the PUI is fully represented on a single panel (as in the example of FIG. 1), no navigation icons are required.

The syntax of the PUI is such that there are only two types of icons presented to the user, which greatly reduces training time for new users. The square icons 52, 54, 56, 60, i.e., the navigation icons, provide the capability to navigate from panel to panel, and the rounded icons 58, 62, i.e., the task icons, implement the control and operate the computer. The arrows linking the icons 58, 60, 62 represent the data flow being managed by the system and indicate data dependency between tasks. Data dependency in this case means that the task being pointed at depends on data from the task from which the arrow originates.

Figure 3:
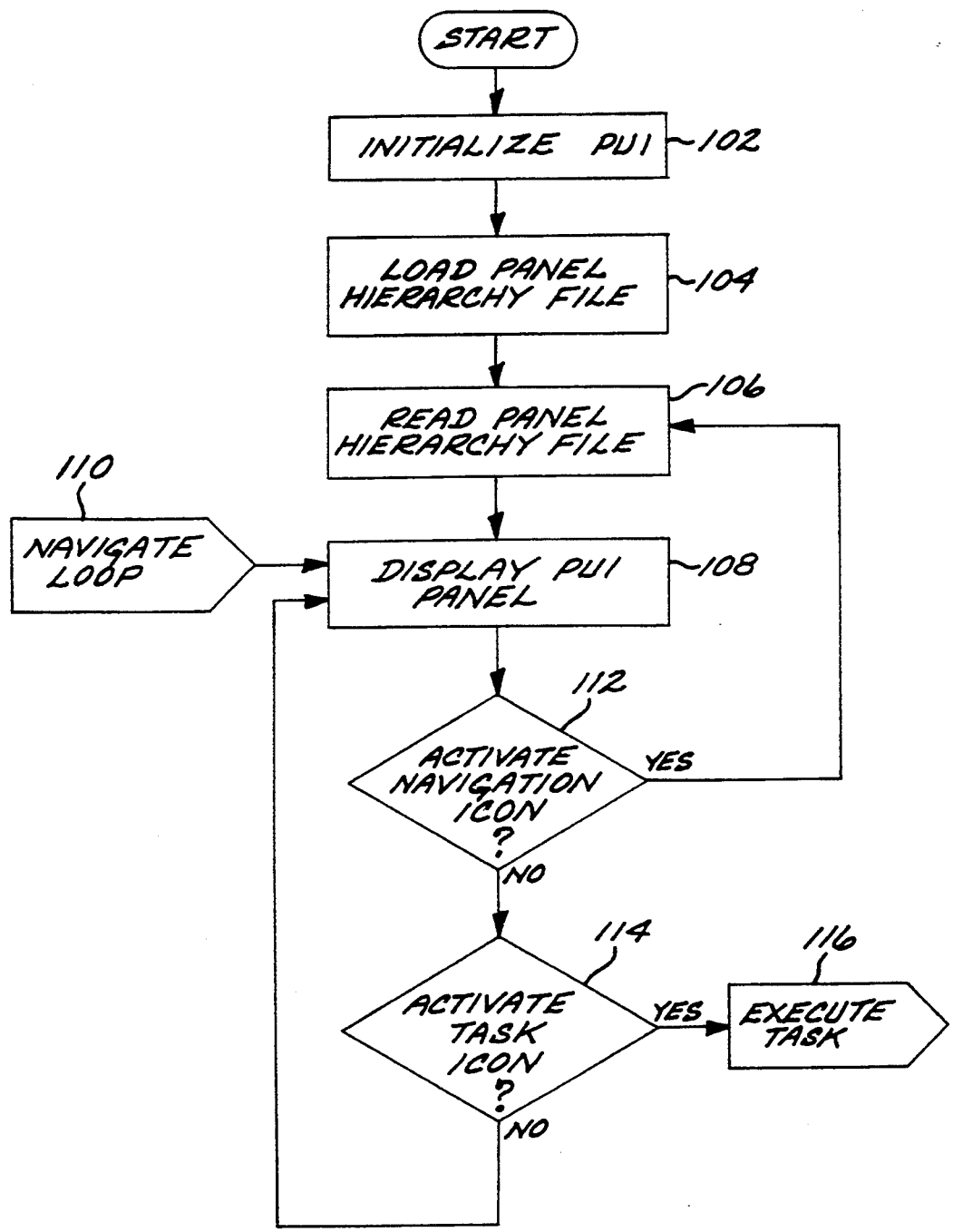
FIGS. 3 and 4 illustrate a flow diagram illustrating the operation of a PUI in accordance with this invention.
Figure 4:
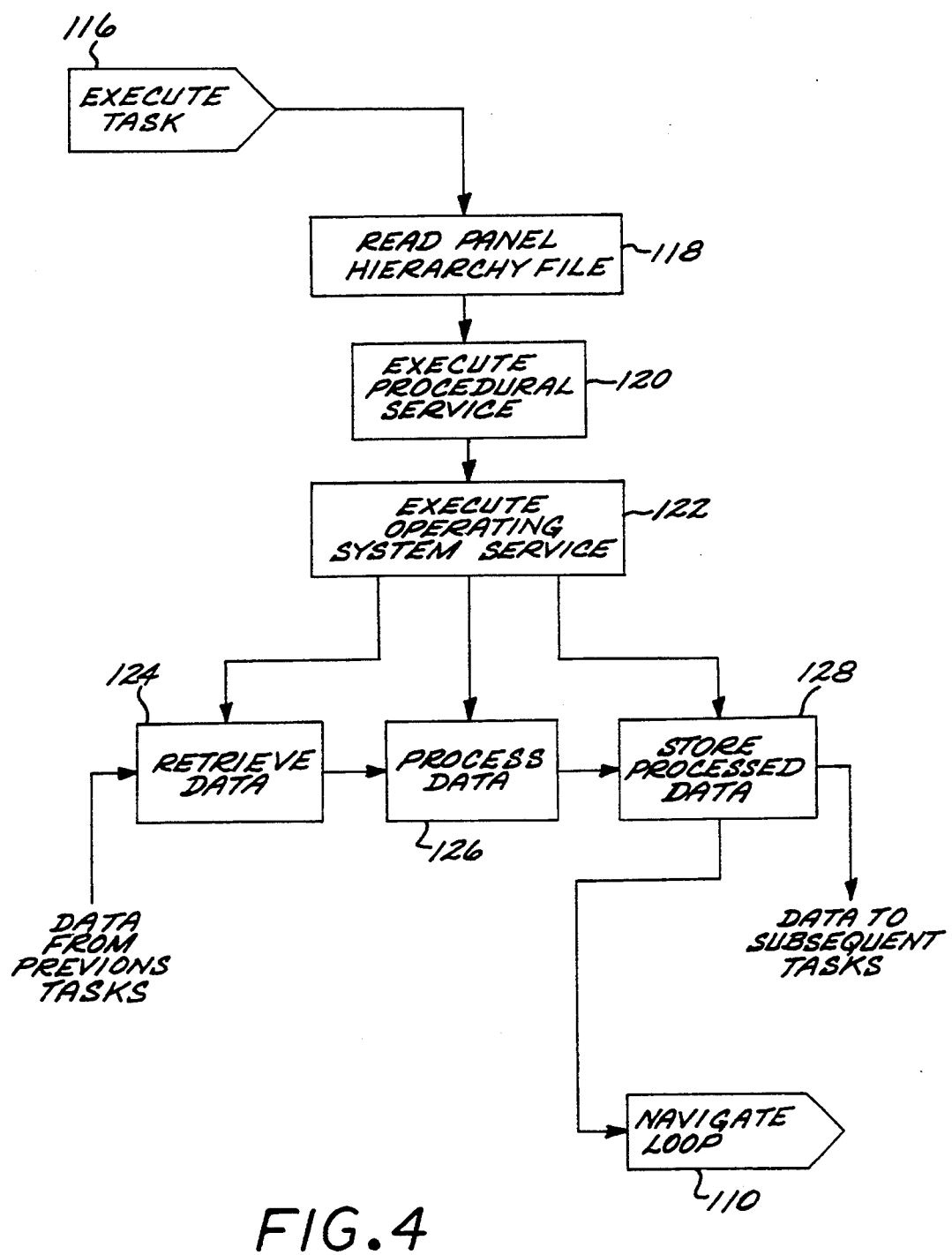

FIGS. 3 and 4 illustrate the flow diagram for how the PUI functions. There are two operational capabilities provided in the PUI. The first is the capability to navigate from panel to panel and the second is the capability to execute functions. When the PUI program first executes, the operating system environment is initialized (step 102). A panel hierarchy file is loaded into memory (step 104). This hierarchy file contains data representing the graphic definitions of the user's tasks, icons, and panels, and includes the hierarchy structure. The first or root panel is displayed on the display screen. When a navigation icon is activated, the panel represented by that icon is retrieved from the hierarchy file and displayed on the screen (steps 106 and 108). (For simple PUI representations, the root panel may be the only panel, and there is no need for navigation icons in this case.)

When a task icon is activated (step 114), the hierarchy file is read (step 118) to retrieve the executable instructions to be automatically implemented (step 120). These executable instructions are referred to as procedural services. Procedural services are defined as small executable programs which directly interact with the operating system of the computer. These small programs can be represented as UNIX shell scripts, IBM personal computer batch files, custom small scale applications, or any other scripting or macro based capability designed to automate interaction with the operating system of the computer. The purpose of the procedural services is to implement the operating system commands required to load files, launch applications, format disks, and so on, so the human operator can be isolated from that level of expertise. The procedural services utilize the operating system services to execute their commands (step 122).

System services are platform dependent operating system features and command available to control the operation of the computer. To execute the system services, data from the operations performed by activation of the previous task icon are retrieved from the appropriate storage medium (step 124). This can be a data file, a database record, a random access memory location or any other storage capability available on the platform. The data are processed as required and results are stored (steps 126 and 128). This newly processed data are made available to the next task in the procedure to be activated by the user. Once the processing is completed, the executable function returns to the navigation loop (step 110).

Any job that can be structured as a series of repeatable tasks can be represented in a PUI. It is applicable to any system in which information is processed and presented to the user in intermediate steps requiring a decision or judgment to be made related to the processed information. These systems can include those such as used in command and control, office automation, security administration, planning, training and simulations, and equipment test stations.

Figure 5:
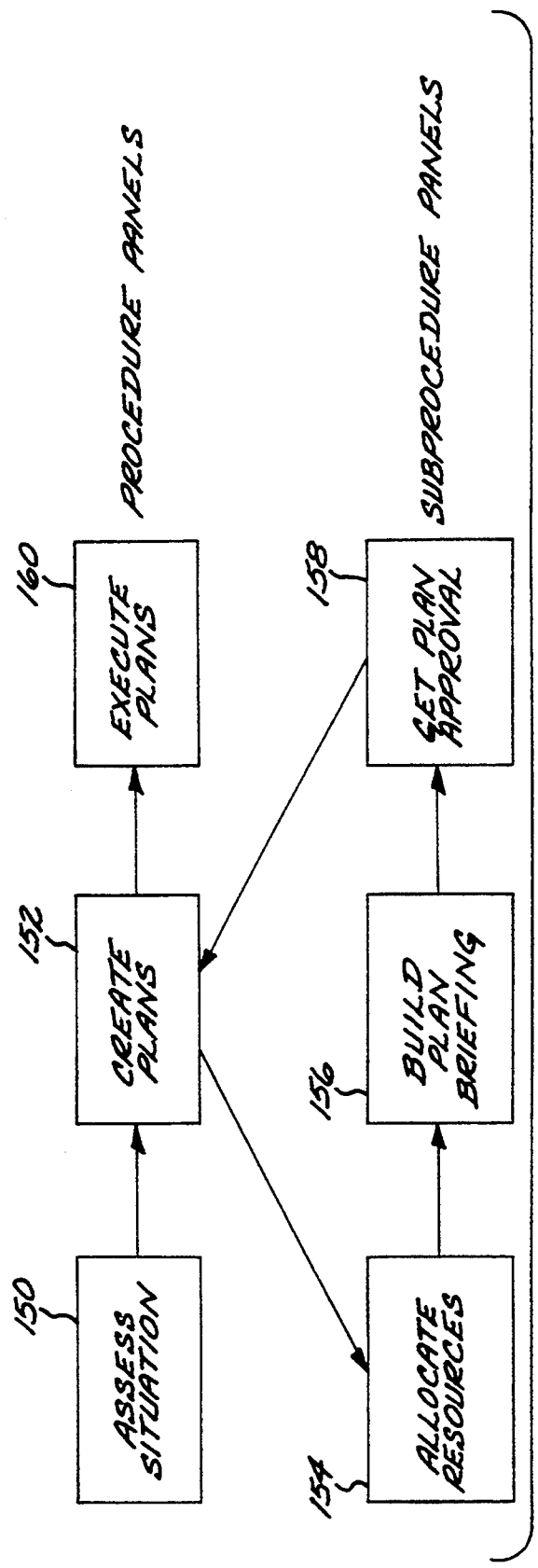
FIG. 5 illustrates a PUI hierarchy structure for an exemplary command and control planning system.

An example of an application of the PUI in the field of command and control is for a planning system in which a human user assesses a situation, creates a plan to address the situation, then executes the plan applicable to the situation. In this example, due to the size and complexity of the system, the PUI operation is represented in a hierarchical series of panels containing logical groupings of tasks. FIG. 5 illustrates a root panel showing the hierarchical PUI structure of this example system.

Figure 6:
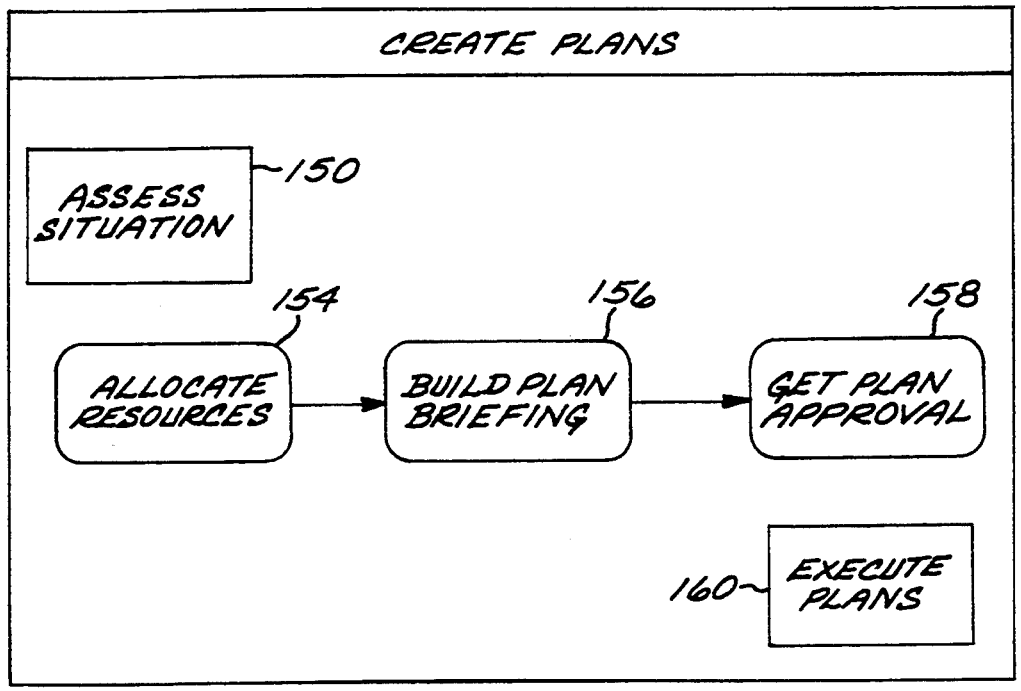
FIGS. 6–9 illustrate exemplary panels for the PUI structure of FIG. 5.

After assessing the situation (step 150), the user must create a plan to address the problem detected (step 152). To create a plan, the user must allocate appropriate resources to be used to solve the detected problem (step 154), build a briefing to present the plan to solve the problem (step 156), and then get plan approval (step 158) before executing the plan (step 160) and solving the detected problem. Each box in this hierarchy represents a PUI panel. Since the "Create Plans" panel 152 has three sub-tasks associated with it, three navigation icons 154, 156 and 158 are represented in FIG. 6.

Figure 7:
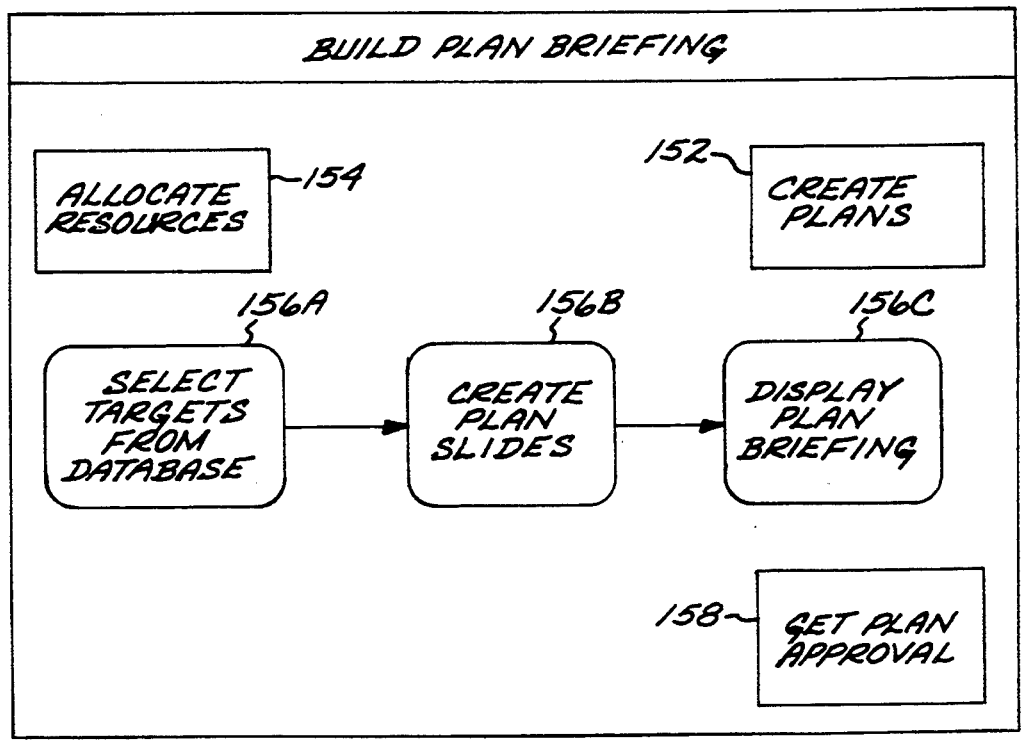

Once in the "Build Plan Briefing" task (FIG. 7), the user can navigate to the previous panel which is the "Allocate Resources" procedure (154) or the user can navigate to the next panel which is the "Get Plan Approval" procedure (158). While in the "Build Plan Briefing" task, the user can execute the sub-tasks 156A, 156B and 156C. Thus, by activating task icon 156A, the computer automatically executes the procedure of selecting targets from the database. By next activating task icon 156B, plan slides are automatically created. Then, by activating task icon 156C, the plan briefing is displayed. As represented in FIG. 7, the tasks 156A, 156B and 156C require data generated from execution of the previous sub-task.

Figure 8:
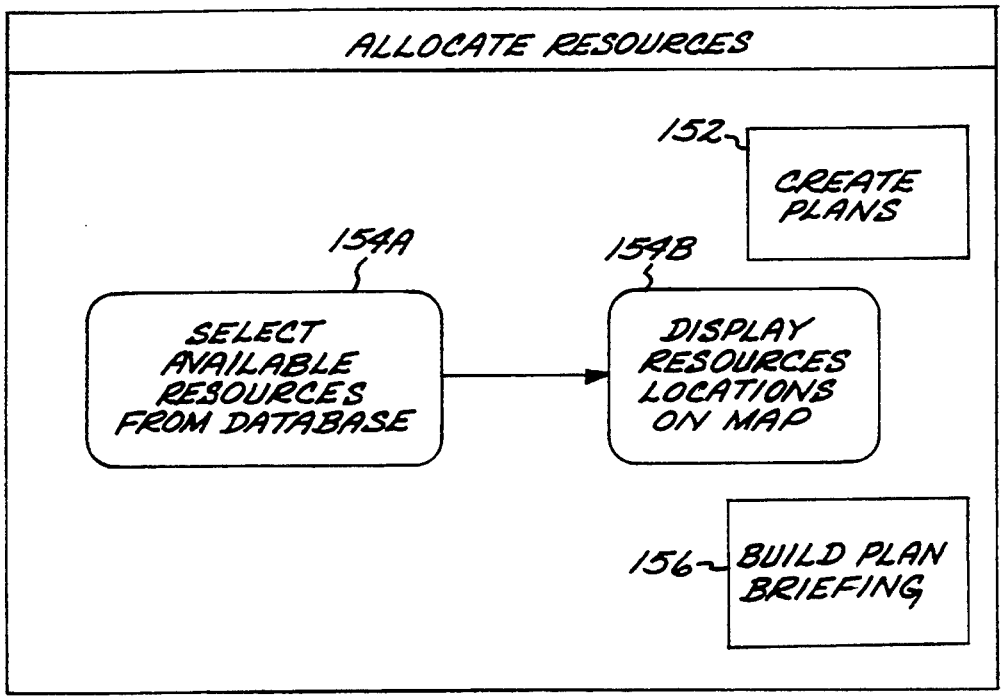

The "Allocate Resources" panel is illustrated in FIG. 8. The user can navigate to either the "Create Plans" panel or the "Build Plan Briefing" panel, or can execute the sub-tasks to allocate resources. Thus, activation of task icon 154A causes the available resources to automatically be selected from the database. Activation of icon 154B causes the resource locations to be automatically displayed on a map.

Figure 9:
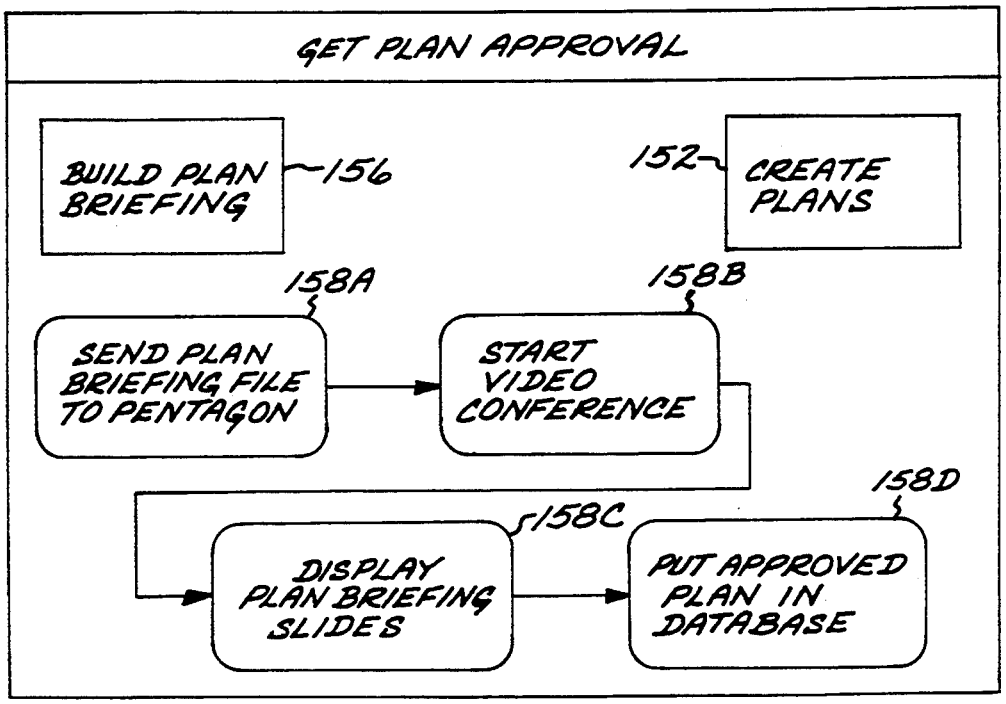

The "Get Plan Approval" panel is illustrated in FIG. 9. Here, the user can navigate to the "Build Plan Briefing" panel or the "Create Plans" panel by activating icon 156 or 152. To execute the subtasks represented on this panel, activation of icon 158A automatically sends the plan briefing file to the Pentagon. Activation of icon 158B automatically starts a video conference. Activating icon 158C causes the plan briefing slides to be displayed. Activation of task icon 158D automatically stores the approved plan in the computer database.

The user simply activates the appropriate square icons to navigate from panel to panel and activates the rounded icons to perform the required steps to execute the procedure. The user does not have to be expert in operating the computer to perform these tasks and must only be expert enough in the command and control discipline to know that the answer presented by the system is correct.

Figure 10:
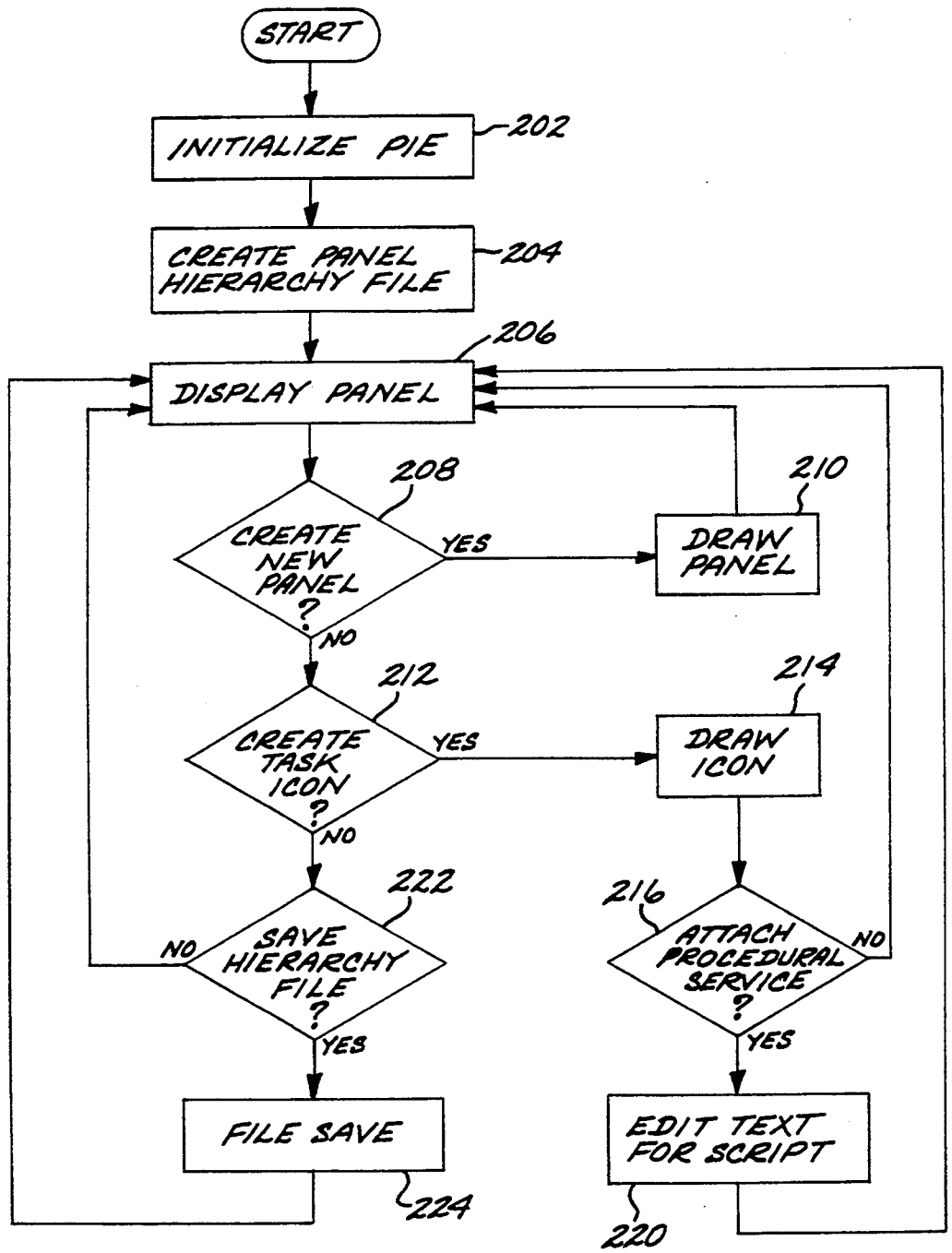
FIG. 10 illustrates a flow diagram for a graphic editor useful for creating PUI representations.

The preferred method of creating PUI representations is to use a graphic editor which allows panels to be created and hierarchically linked to one another, allows icons to be drawn, and attaches the system services and procedural services to the icons. This graphic editor tool is referred to as the Procedural Interface Editor (PIE). FIG. 10 illustrates the flow diagram for use of the PIE.

The PIE provides a graphic means to develop PUIs. When the PIE program first executes, the operating system environment is initialized (202). A panel hierarchy file is created in memory (step 204). This hierarchy file contains the graphic definitions of the user's task, icons, and procedures and includes the hierarchy structure. The PIE provides the capability to create a panel (step 204) on which icons may be drawn. A blank panel is first created (steps 208, 210), then both navigation and task icons can be placed on that panel by selecting the appropriate drawing tool (step 212 or 222). When a task icon is drawn, a procedural service is attached to that icon using the procedural service tool (steps 216, 220). The procedural service tool allows the names of the procedural service macros or scripts to be associated with the icon so that when the rounded icon is activated, the attached procedural service will be executed. When all procedures are captured in the PUI representation, the PIE saves the definitions in a hierarchy file (step 224) that is utilized by the PUI application.

Figure 11:
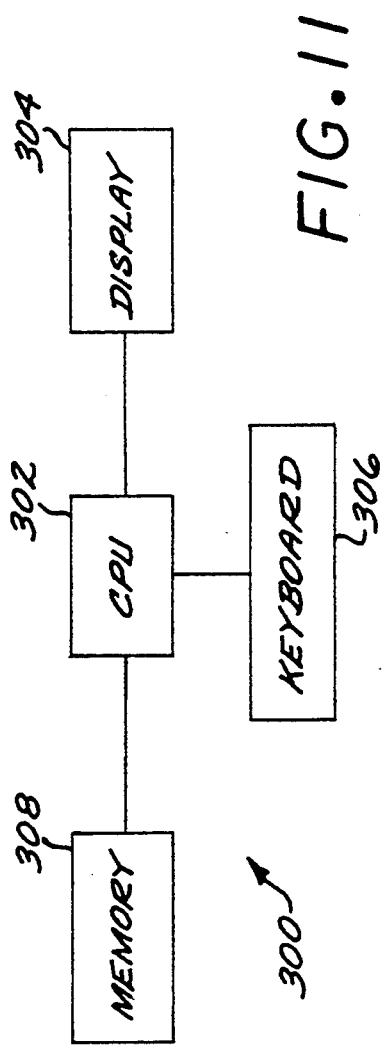
FIG. 11 is a simplified block diagram of a typical digital computer system which may be employed to implement a PUI in accordance with this invention.

FIG. 11 illustrates in simplified form elements of a digital computer system 300 which may be employed to implement a PUI in accordance with this invention. The system 300 comprises a central processing unit (CPU) 302, a computer display 304, an keyboard 306 or other user data input means, and a memory 308. The user may operate the keyboard, or a computer mouse, touch sensitive display screen, light pen, or other user input means to activate a particular icon displayed on device 304. The panel hierarchy file can be loaded into the memory 308, and all processing steps can be carried out by CPU 302. If the system 302 comprises a personal computer with a DOS-type operating system, for example, the procedures implemented by the CPU will be instruction sets which may be executed by the DOS operating system.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for controlling the operation of a digital computer system comprising a memory, a visual display and a means for accepting user data input, said method for causing to be performed by said computer system a job which is structured as a series of repeatable tasks, comprising a sequence of the following steps:

displaying the tasks comprising said job as a series of linked icons on a plurality of hierarchical display panels which provide a graphical representation of the tasks comprising the job and a sequence in which said tasks are to be performed to accomplish the job, said graphical representation including a representation indicating data dependence between linked ones of said icons, said linked icons comprising navigation icons and task icons, wherein said navigation icons provide the capability to navigate from panel to panel, and said task icons provide the capability of operating the computer to automatically execute the required computer functions necessary for performing particular task operations represented by said task icon;

causing the computer operations to navigate to a particular display panel in response to activation of a particular linked navigation icon and to display said particular display panel; and causing predetermined computer operations to be initiated in response to activation of a particular linked task icon, and automatically managing a flow of data in accordance with said data dependence between operations represented by sequentially activated linked task icons.

2. The method of claim 1 further comprising the step of storing a panel hierarchy file in memory, said file containing data representing graphic definitions of said job, said icons and panels generated during execution of said method, and wherein said step of causing predetermined computer operations to be initiated in response to activation of a particular task icon comprises reading said panel hierarchy file, retrieving executable instructions to be automatically executed, executing said executable instructions, and processing data in accordance with predetermined processing instructions for said particular activated icon.

3. The method of claim 2 wherein said step of causing predetermined computer operations to be initiated in response to activation of a particular task icon comprises, for at least one such task icon, retrieving data processed from operations initiated in response to a previous activation of another of said task icons, processing said retrieved data in accordance with said predetermined processing instructions, and storing said processed data.

4. The method of claim 1 further comprising the step of storing a panel hierarchy file in memory, said file containing data representing graphic definitions of said task, said icons and panels generated during execution of said method, and wherein said step of causing said computer operations to navigate to a particular display panel in response to activation of particular navigation icons comprises reading said panel hierarchy file and displaying on said computer display said particular display panel.

5. The method of claim 1 further comprising the step of displaying on one or more of said display panels a plurality of unlinked navigation icons which are not displayed as linked to other icons, each unlinked navigation icon representing a predetermined display panel, and further comprising the step of displaying said predetermined display panel in response to activation of said unlinked navigation icon by the user.

6. The method of claim 1 wherein said display panels include only two types of icons, said two types consisting of said navigation and task icons, and wherein said navigation icons has a navigation icon visual configuration, said task icon has a task icon visual configuration which presents a different visual appearance from a visual appearance of said navigation icon.

7. A digital computer system comprising:
a memory;
a visual display;
user data input means;
a central processing unit (CPU) operatively connected to said memory, said visual display and said user data input means, said CPU comprising means for causing to be performed by said computer system a job structured as a series of repeatable tasks, said means comprising:

means for displaying the tasks comprising said job as a series of linked icons on a plurality of hierarchical display panels which provide a graphical representation of the tasks comprising the job and a sequence in which said tasks are to be performed to accomplish the job, said graphical representation including a linkage representation indicating a data dependence between linked ones of said icons, said linked icons comprising navigation icons and task icons, wherein said navigation icons provide the capability to navigate from panel to panel, and said task icons provide the capability of operating the computer to automatically execute the required computer functions necessary for performing particular operations represented by said task icon;

means for causing the computer operations to navigate to a particular display panel in response to activation of a particular navigation icon and to display said particular display panel; and means for causing predetermined computer operations to be initiated in response to activation of a particular linked task icon, and automatically managing a flow of data in accordance with said data dependence between operations represented by sequentially activated linked task icons.

8. The system of claim 7 further comprising means for storing a panel hierarchy file in memory, said file containing data representing graphic definitions of said job, said icons and panels generated during execution of said method, and wherein said means for causing predetermined computer operations to be initiated in response to activation of a particular task icon comprises means for reading said panel hierarchy file, means for retrieving executable instructions to be automatically executed, means for executing said executable instructions, and means for processing data in accordance with predetermined processing instructions for said particular activated icon.

9. The system of claim 8 wherein said means for causing predetermined computer operations to be initiated in response to activation of a particular task icon comprises, for at least one such task icon, means for retrieving data processed from operations initiated in response to a previous activation of another of said task icons, means for processing said retrieved data in accordance with said predetermined processing instructions, and means for storing said processed data.

10. The system of claim 7 further comprising means for storing a panel hierarchy file in memory, said file containing data representing graphic definitions of said task, said icons and panels generated during execution of said method, and wherein said means for causing said computer operations to navigate to a particular display panel in response to activation of particular navigation icons comprises means for reading said panel hierarchy file and means for displaying on said computer display said particular display panel.

11. The system of claim 7 wherein said display panels include only two types of icons, said two types consisting of said navigation and task icons, and wherein said navigation icons has a navigation icon visual configuration, said task icon has a task icon visual configuration which presents a different visual appearance from a visual appearance of said navigation icon.

* * * * *